US 6,662,133 B2

(12) United States Patent
Engel et al.

(10) Patent No.: US 6,662,133 B2
(45) Date of Patent: Dec. 9, 2003

(54) JTAG-BASED SOFTWARE TO PERFORM CUMULATIVE ARRAY REPAIR

(75) Inventors: Christopher John Engel, Rochester, MN (US); Norman Karl James, Liberty Hill, TX (US); Brian Chan Monwai, Austin, TX (US); Kevin F. Reick, Austin, TX (US); Philip George Shephard, III, Round Rock, TX (US); Marco Zamora, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 09/798,291

(22) Filed: Mar. 1, 2001

(65) Prior Publication Data

US 2002/0123854 A1 Sep. 5, 2002

(51) Int. Cl.$^7$ .............................................. G06F 11/277
(52) U.S. Cl. ....................... 702/117; 702/118; 714/733; 714/736
(58) Field of Search .............................. 702/117, 57–59, 702/64, 65, 75, 80, 118–120, 123, 124, 185, 189, FOR 103, FOR 104, FOR 106, FOR 107, FOR 134, FOR 135, FOR 170, FOR 171; 324/73.1; 714/30, 42, 718–720, 724, 733, 734, 736, 738, 7; 365/201

(56) References Cited

U.S. PATENT DOCUMENTS

| 5,835,502 A | * | 11/1998 | Aipperspach et al. ........ 714/718 |
| 6,001,662 A | * | 12/1999 | Correale et al. .............. 438/11 |
| 6,115,763 A | * | 9/2000 | Douskey et al. .............. 710/72 |
| 6,259,637 B1 | * | 7/2001 | Wood et al. ................. 365/200 |
| 6,374,370 B1 | * | 4/2002 | Bockhaus et al. ............ 714/39 |
| 6,393,594 B1 | * | 5/2002 | Anderson et al. ........... 714/738 |

* cited by examiner

Primary Examiner—Hal Wachsman
(74) Attorney, Agent, or Firm—Duke W. Yee; Mark E. McBurney; Lisa L. B. Yociss

(57) ABSTRACT

Repairing arrays on a processor with an on chip built in self test engine on the processor is provided. A subset of the arrays is selected for testing. Data patterns are sent from the test engine to the subset of arrays at a plurality of operating parameters. A response is received at the test engine from the subset of arrays at the operating parameters. The received response is compared to an expected response using the test engine, wherein the processor controller determines if additional test failures were detected by the test engine for the subset of arrays with a plurality of JTAG based instructions. Code in the processor controller then determines the states that need to be scanned into the scannable latches to force the array control logic to choose additional spare wordlines and/or bitlines to repair the newly identified failures in addition to all previously defined repair actions.

25 Claims, 4 Drawing Sheets

JTAG-BASED SOFTWARE TO PERFORM CUMULATIVE ARRAY REPAIR

BACKGROUND OF THE INVENTION

1. Technical Field

The present invention relates generally to repairing integrated circuits and in particular to a method and apparatus for cumulatively repairing arrays in an integrated circuit.

2. Description of Related Art

Traditional interconnect testing, like that described in Joint Test Action Group (JTAG) Institute of Electrical and Electronics Engineers (IEEE) standard 1149.1, has a strong dependence on software interaction and scan functions. IBM has expanded this single card testing concept in the original JTAG specification to multiple card testing within a system (Wire Test). The traditional Wire Test method involves scanning test patterns into the boundary latches of all chips in a system interface, sampling at all chips' interfaces, and scanning the patterns out of each chip to compare the resulting patterns. This process is repeated so that every driver drives at least once in the system, with multiple patterns on each interface, to determine and diagnose problems such as shorts and opens on these interfaces, if they exist. In this manner, it can be determined if all interconnections between chips in a system are intact. Manufacturing and system assembly relies heavily on such patterns to test systems as they are built and to diagnose manufacturing problems.

In general, integrated circuit arrays are tested by providing a known data input at a known address to the array and comparing the output to an expected output. One well known and widely used prior art system for testing integrated circuit logic, particularly integrated circuit memory arrays, is to form a dedicated test circuit on the chip with the array itself. This circuit also is called an array built-in self-test (ABIST) circuit or engine. This type of technology allows for high speed testing without having to force correspondence between the array and input/output connections to the chip itself. Random access memory on a chip, such as the memory provided for processors, are usually tested using an ABIST engine.

It is increasingly common to have multiple arrays present on a chip. In testing these arrays, some arrays only need a subset of some tests that are performed on the set of arrays. Other tests may not work on all of the arrays, thereby requiring special test circuitry in certain circumstances. A microprocessor's ABIST may report failing array addresses for some arrays for each ABIST run. However, arrays may fail in multiple ways at different voltage points or frequencies.

Presently, a trend exists towards smaller electronic components which has resulted in higher component density and greater circuit complexity on a given-sized circuit board. The increase in circuit complexity has increased the difficulty of accomplishing in-circuit testing by physically accessing the circuits with a test fixture so that the response of the circuits to an external stimulus can be sensed. Indeed, as surface-mounted components (i.e., components which are mounted on a major surface of the circuit board) proliferate, physical access to the circuits on the board by traditional test fixtures may become impossible. For these reasons, much effort has been devoted to developing alternative testing techniques.

A testing technique known as "boundary scan" has gained prominence as an alternative to traditional in-circuit testing by physically accessing the board through a test fixture. The boundary scan testing technique is embodied in a detailed specification (Version 2.0) authored by an international standards committee known as the Joint Test Action Group (JTAG).

Accomplishing boundary scan testing requires that in addition to its normal application logic, each active component (e.g., integrated circuits) be fabricated with circuits known as "boundary scan cells" (BSCs) whose details are described in the JTAG standard. Each BSC is coupled between the application logic and one of the functional input and output pins of the integrated circuit such that each functional input and output pin is coupled to a separate one of a normal data input and normal data output, respectively, of the BSC.

During normal operation of the integrated circuit, the signal applied to each functional input pin passes through the corresponding BSC and then into the application logic without effect. Similarly, signals from the application logic pass through the corresponding BSCs to each separate functional output pin without effect. Thus, the normal operation of the integrated circuit remains unaffected by the BSCs.

In addition to its normal data input and output, each BSC has a test data input and test data output (also known as test access ports) connected so that each bit of a test vector applied to the test data input is serially shifted to the test data output of the BSC during operation thereof in a test mode. Also, the test data input of each BSC is linked to its normal data output so the test vector bit, shifted into the BSC during testing, can be applied to its normal data output.

Since integrated circuit arrays may fail differently at different voltages and/or frequencies, it would be advantageous to have an improved method and apparatus for using JTAG to control ABIST and perform cumulative array correction over different voltages and frequencies.

SUMMARY OF THE INVENTION

A method is provided for repairing a plurality of arrays on a processor with an on chip built in self test engine on the processor. A subset of the plurality of arrays is selected for testing. Data patterns are sent from the on chip built in self test engine to the subset of the plurality of arrays on the processor at a plurality of operating parameters. A response is received at the on chip built in self test engine from the subset of the plurality of arrays at the plurality of operating parameters. The response from the subset of the plurality of arrays is compared to an expected response using the on chip built in self test engine, wherein the on chip built in self test engine compares the response from the subset of the plurality of arrays with a plurality of JTAG based instructions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
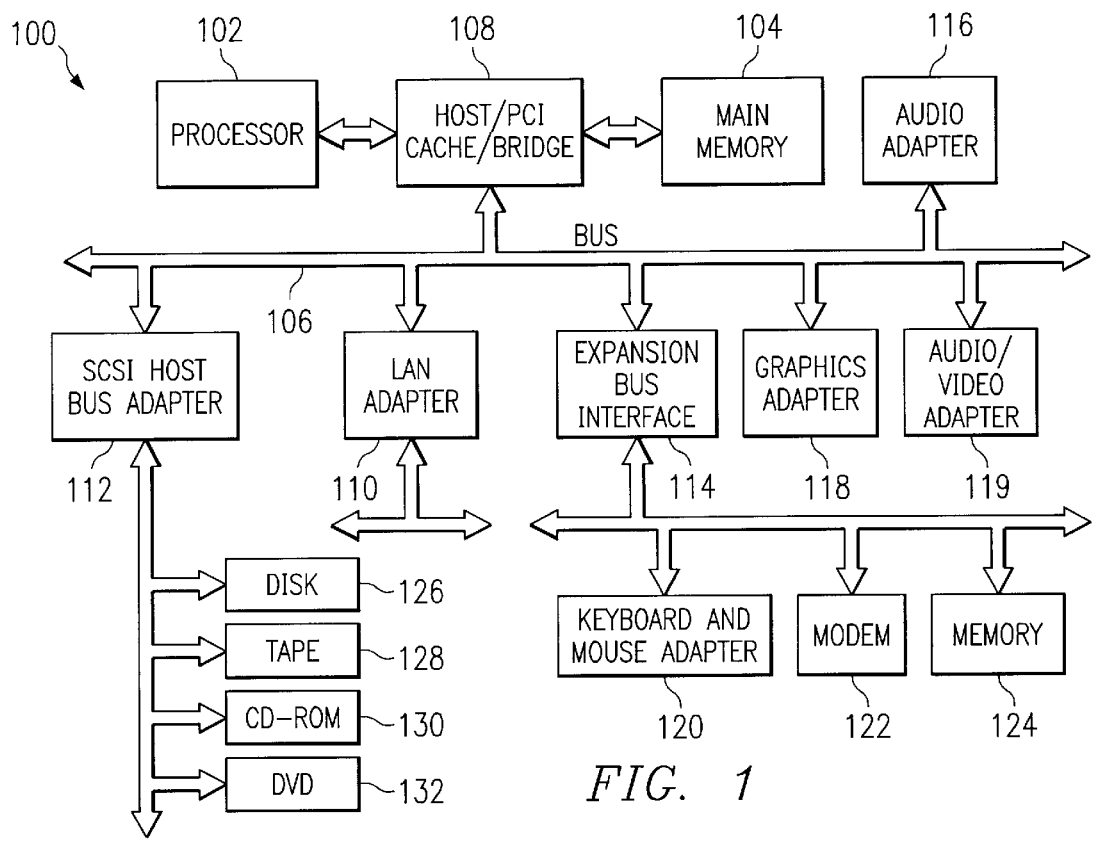
FIG. 1 depicts a block diagram of a data processing system in which the present invention may be implemented.

With reference now to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures, such as Micro Channel and ISA, may be used. Processor 102 and main memory 104 are connected to PCI local bus 106 through PCI bridge 108. PCI bridge 108 may also include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. In the depicted example, SCSI host bus adapter 112 provides a connection for hard disk drive 126, tape drive 128, CD-ROM drive 130, and digital video disc read only memory drive (DVD-ROM) 132. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as Windows 2000, which is available from Microsoft Corporation. Windows 2000 is a trademark of Microsoft Corporation. An object oriented programming system, such as Java, may run in conjunction with the operating system, providing calls to the operating system from Java programs or applications executing on data processing system 100. Instructions for the operating system, the object-oriented operating system, and applications or programs are located on a storage device, such as hard disk drive 126, and may be loaded into main memory 104 for execution by processor 102.

Those of ordinary skill in the art will appreciate that the hardware in FIG. 1 may vary depending on the implementation. For example, other peripheral devices, such as optical disk drives and the like, may be used in addition to or in place of the hardware depicted in FIG. 1. The depicted example is not meant to imply architectural limitations with respect to the present invention. For example, the processes of the present invention may be applied to multiprocessor data processing systems.

The processes of the present invention are performed by service processor (SP) 102 using computer implemented instructions, which may be located in a memory such as, for example, main memory 104, memory 124, or in one or more peripheral devices 126–132. SP 102 may be included in the system or attached in manufacturing or for special field testing. The service interface may be IEEE 1149.1 JTAG, $I^2C$, or any other interface style.

Figure 2:
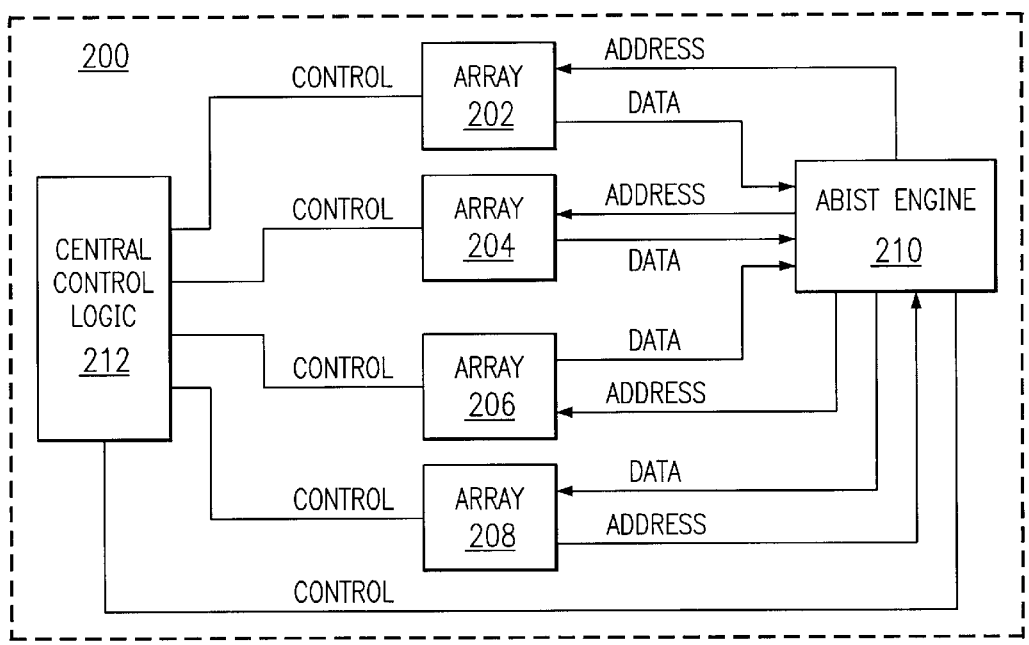
FIG. 2 is an exemplary diagram illustrating a portion of an integrated circuit chip depicted in accordance with the preferred embodiment of the present invention.

FIG. 2 is a diagram illustrating a portion of an integrated circuit chip is depicted in accordance with the preferred embodiment of the present invention. In this example, region 200 in the integrated circuit chip includes a set of memory arrays, array 202, array 204, array 206, and array 208. Also within region 200, is an array built in-self test (ABIST) engine 210, which is used to generate a sequence of data patterns input and addresses input to array 202, array 204, array 206, and array 208. A data pattern is read into these arrays and then read out. Logic circuitry within ABIST engine 210 compares the data output from an array with the expected data output pattern, such as the input data pattern. ABIST engine 210 provides, for example, a pass/fail output indication for each of the arrays or for the arrays as a group depending on the particular implementation or test. Additionally, a fail address function may be implemented to identify the address at which an error occurred. Further, central controller logic 212 also includes a control connection to ABIST engine 210. This control allows the compare function, also referred to as "fail generation logic", in ABIST engine 212 to be selectively enabled and disabled. Central controller logic 212 in this example is provided to selectively enable and disable functions in the arrays.

The present invention provides a method and apparatus for using JTAG to control the ABIST engine and perform cumulative array correction over different voltages and frequencies. The present invention expands the capabilities of existing hardware to create a hardware-driven interconnect test controlled by software. For example, software residing on a host machine may use JTAG to communicate with a processor under test. The software may run ABIST and gather and compare results at a plurality of points, such as, for example, voltage and frequency points. If a failure occurs, the software may scan data into the processor under test so that the processor uses alternate wordlines or bitlines within an array. Repair values may be stored in a database, either an internal or external database and keyed by part number. As a result, for example, the voltage and/or frequency of the processor under test may then be changed. Prior to running a next pass of ABIST, values may be retrieved from the database and written to a chip. New results may be compared with previous values and also stored in a database. This process may be repeated at each point, for example, at each voltage and/or frequency point. Final values are stored in the database and may be accessed during a power-on sequence. If during the power-on sequence the database is unavailable, the software may still be able to do array repair at a current voltage and/or frequency.

Some imbedded arrays may contain spare words and/or bits which can be used to repair arrays containing defects. These spares may be activated by blowing fuses and/or setting values into latches in the design. In one embodiment, the present invention includes structures of this type, where spare RAM cells may be activated and may be selected by loading values into latches.

Figure 3:
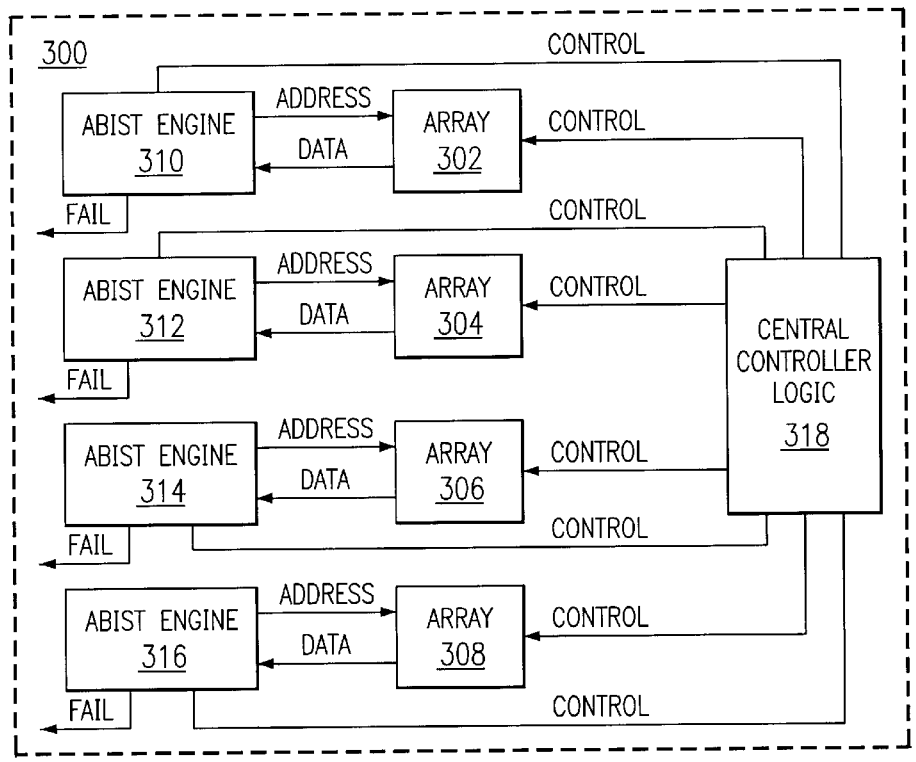
FIG. 3 is an illustration of a portion in an integrated circuit containing ABIST engines and arrays depicted in accordance with the preferred embodiment of the present invention.

FIG. 3 is an illustration of a portion in an integrated circuit containing ABIST engines and arrays and is depicted in accordance with the preferred embodiment of the present invention. In this example, region 300 includes arrays 302, 304, 306, and 308. In this example, each of these arrays are individually tested by an ABIST engine, ABIST engines 310, 312, 314, and 316. Each of these ABIST engines individually produces a result based on the test on the associated array. Central controller logic 318 generates different control signals to selectively enable and disable arrays 302, 304, 306, and 308 for the different tests. Central controller logic 318 also has connections to ABIST engines 310, 312, 314, and 316. These connections are used to selectively enable and disable fail generation logic in the ABIST engines.

In addition, the illustration of the components in FIGS. 2 and 3 are not meant to indicate architectural limitations to the mechanism of the present invention. For example, although only four arrays are illustrated, more or less arrays may be used depending on the particular implementation. Additionally, central controller logic is illustrated as being separate from ABIST engine 210 in FIG. 2 and ABIST engines 310, 312, 314, and 316 in FIG. 3. These diagrams are only for purposes of illustrating the features of the present invention. Of course, central controller logic shown in FIGS. 2 and 3 also could be integrated within the ABIST engines.

Figure 4:
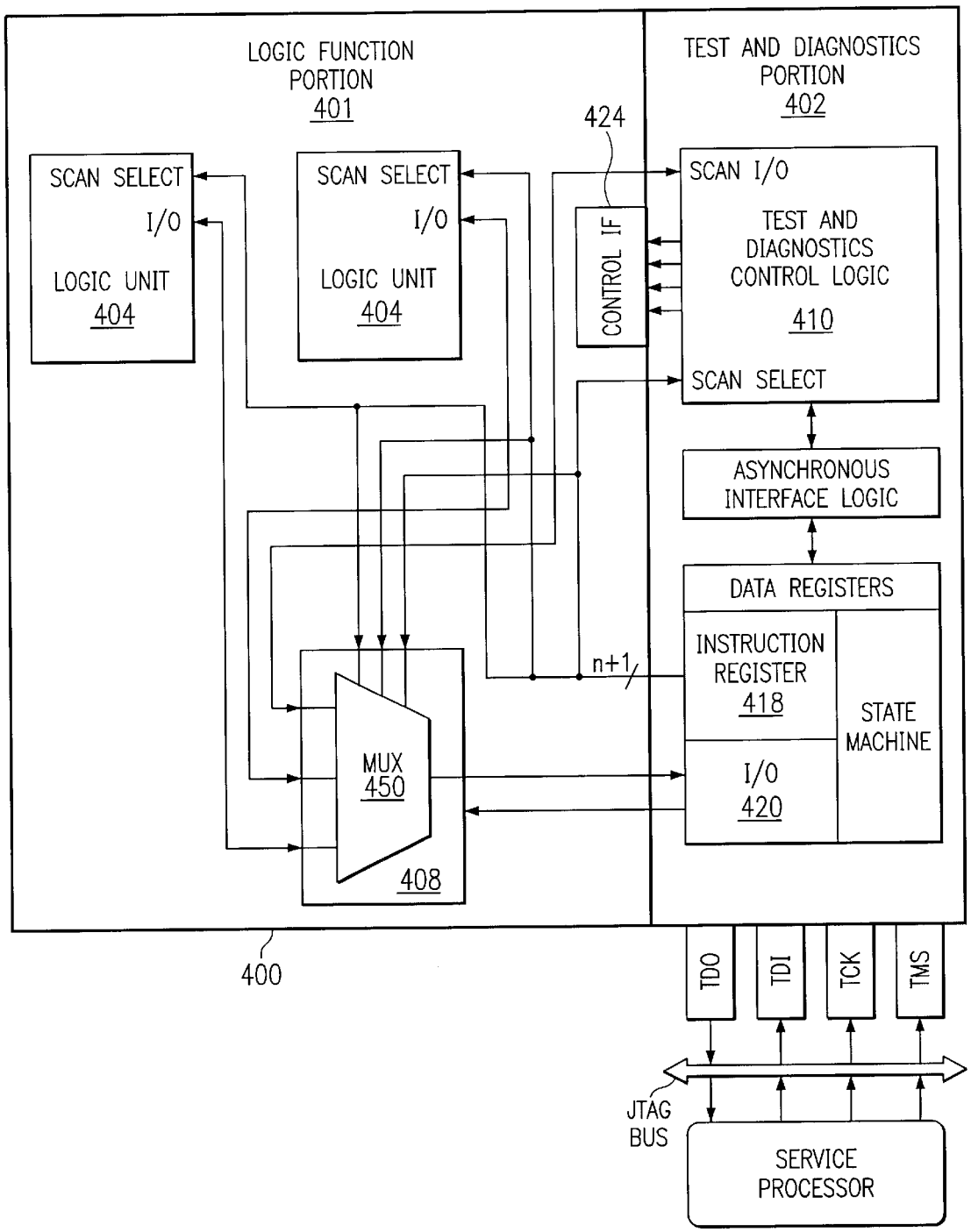
FIG. 4 is an exemplary block diagram depicting a processor chip configured to allow scanning of the free-running logic in accordance with a preferred embodiment of the present invention.

With reference to FIG. 4, a block diagram is shown depicting a processor chip configured to allow scanning of the free-running logic in accordance with a preferred embodiment of the present invention. The chip 400 includes a logic function portion 401 and a test and diagnostics portion 402. The chip communicates with a service processor through a JTAG bus. The logic function portion includes logic units 404, 406 and scan switch 408. For simplicity, the example in FIG. 4 shows only two logic units; however, logic function portion 401 typically includes many more logic units. The test and diagnostics portion includes test and diagnostics control logic 410, asynchronous interface logic, and a JTAG TCK partition. The JTAG TCK partition includes data registers, instruction register 218, input/output (I/O) 420, and a state machine. Test and diagnostics control logic 410 controls the scanning of logic units in the logic function portion through control interface 424.

When an instruction to scan the free-running logic is in instruction register 418, the instruction is decoded to assert the scan select signal of test and diagnostics control logic 210. Scan switch 408 includes multiplexor 450, which is configured to accept scan inputs from logic units 404, 406, as well as test and diagnostics control logic 410. The input of multiplexor 450 is selected by the scan select signals of the logic units and the test and diagnostics control logic. The output of the multiplexor is then sent to I/O 420.

Figure 5:
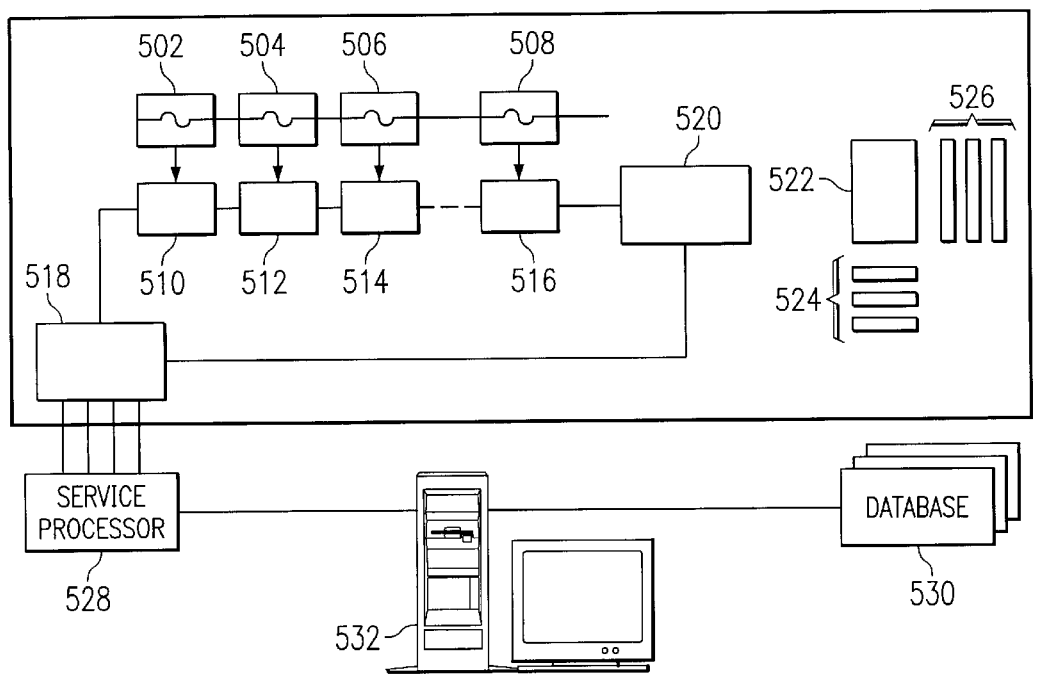
FIG. 5 is an exemplary block diagram depicting using JTAG to control ABIST and perform cumulative array correction in accordance with a preferred embodiment of the present invention.

FIG. 5 is an exemplary block diagram depicting using JTAG to control ABIST and perform cumulative array correction in accordance with a preferred embodiment of the present invention. During manufacturing tests, if arrays are known to fail, fuses 502, 504, 506 or 508 may be blown to force array control logic 520 to choose spare wordlines or bitlines 524 or 526. JTAG may be used in conjunction with any hard-blown fuses to provide the stimulus to the array control logic.

In this embodiment, scan ring 510, 512, 514 and 516 may provide the direct input to array repair control logic 520. Fuses 502, 504, 506 or 508 may be "sampled" and transferred to scan ring 510, 512, 514 and 516, but service processor 526 may override fuse values associated fuses 502, 504, 506 or 508 via scan ring 510, 512, 514 and 516.

During development and initial initialization, service processor 528 may be connected to host machine 532 with software stored in database 530 to track and characterize array failures found during ABIST. Service processor 528 may also access database 530 to determine an optimum array repair setting based on accumulated data.

Figure 6:
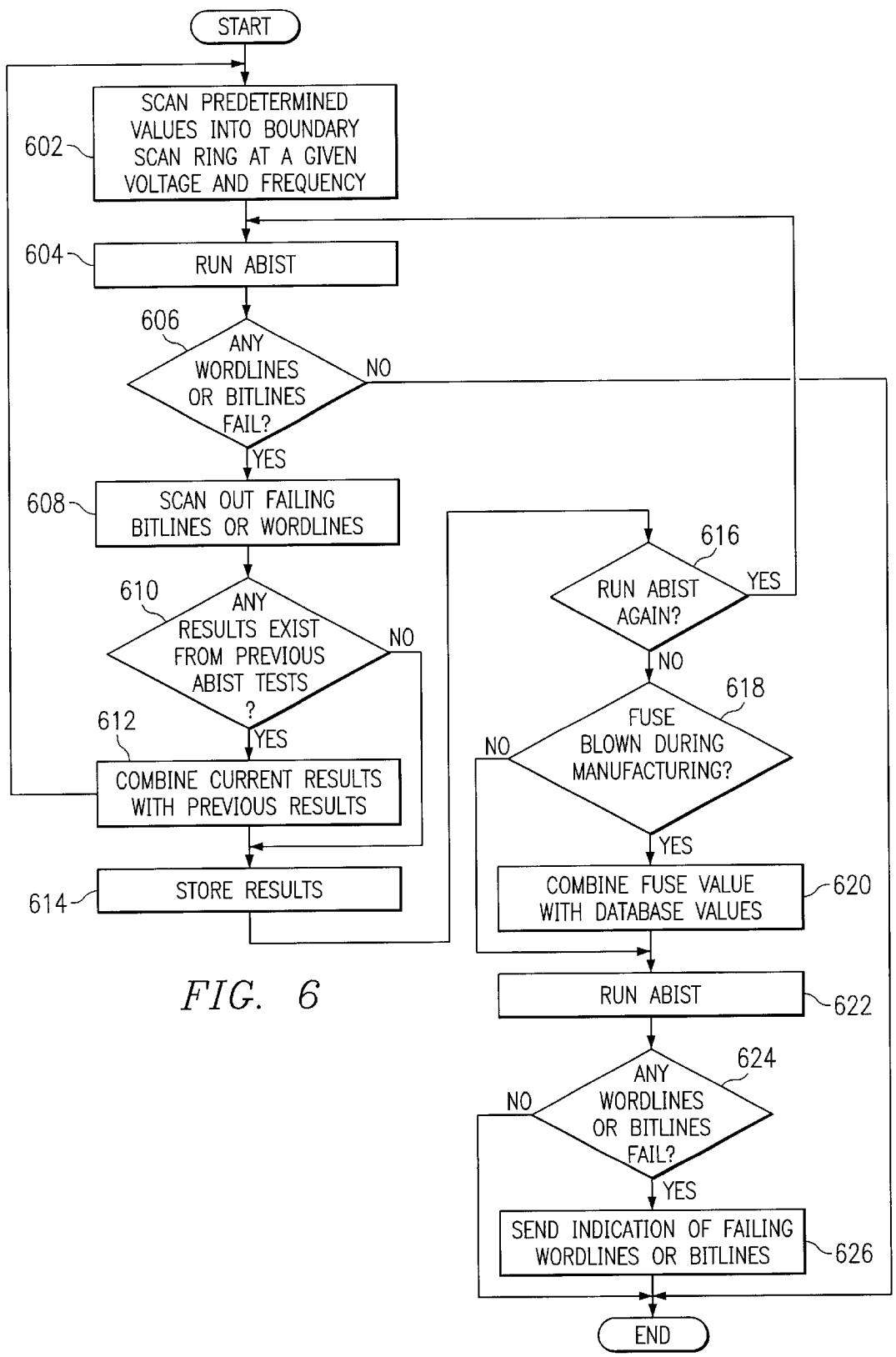
FIG. 6 is a flowchart depicting using JTAG to control ABIST and perform cumulative array correction over different voltages and frequencies in accordance with a preferred embodiment of the present invention.

FIG. 6 is a flowchart depicting using JTAG to control ABIST and perform cumulative array correction over different voltages and frequencies in accordance with a preferred embodiment of the present invention. FIG. 6 is a further illustration of using JTAG to control ABIST and perform cumulative array correction in FIG. 5.

In this example, during development and initialization mode, a service processor or a host machine may scan predetermined values into a scan ring at a given voltage and temperature (step 602). ABIST is run (step 604) and a determination is made as to whether or not any of wordlines or bitlines fail (step 606). If no wordlines or bitlines fail (step 606:NO), the operation terminates. If any wordlines or bitlines do fail (step 606:YES), the failing wordlines or bitlines are scanned out by, for example, a service processor or a host machine (step 608). Then a determination is made as to whether or not any results exist from previous ABIST test(s) (step 610). If a previous result exists from a previous ABIST test (step 610:YES), the current ABIST test results are combined with any previous ABIST test results (step 612). Current ABIST test results may be combined with previous ABIST test results with a logical "OR" function. The combined results are stored (step 614).

Whether the combined results are stored (step 614) or there are no results from previous ABIST test(s) (step 610:NO), a determination is made as to whether or not to run the ABIST test again (step 616). If the ABIST test is to be run again (step 614:YES), the operation returns to step 604. If the ABIST test is not to be run again (step 614:NO), a determination is then made as to whether or not a fuse was blown during manufacturing (step 618). If a fuse was blown during manufacturing (step 618:YES) the fuse value is then combined with stored database values (step 620).

Whether the fuse value is combined with stored database values (step 620) or a fuse was not blown during manufacturing (step 618:NO), the ABIST is run (step 622). Then a determination is made as to whether or not any wordlines or bitlines have failed (step 624). If no wordlines or bitlines have failed (step 624:NO), the operation terminates. If any wordlines or bitlines have failed (step 624:YES), then an indication of failing wordlines or bitlines is sent (step 626) and thereafter the operation terminates.

Therefore, the present invention provides for an improved method and apparatus for using JTAG to control ABIST and perform cumulative array correction under different conditions, such as, for example, voltage and frequency. Predetermined values are scanned into scannable latches at a given voltage and frequency. An ABIST is run which determines if any wordlines or bitlines have failed. Any failing wordlines or bitlines are scanned out and the results are combined with any previous ABIST test results.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for repairing a plurality of arrays on a processor with an on chip built in self test engine on the processor, the method comprising the steps of:

selecting a subset of the plurality of arrays for testing;

sending data patterns from the on chip built in self test engine to the subset of the plurality of arrays on the processor at a plurality of operating parameters;

receiving a response at the on chip built in self test engine from the subset of the plurality of arrays at the plurality of operating parameters;

comparing the response from the subset of the plurality of arrays to an expected response using the on chip built in self test engine;

determining a failing subset of arrays in response to the response from the subset of the plurality of arrays being different from the expected response; and in response to determining the failing subset of arrays, repairing said failing subset of arrays by scanning data into the failing subset of arrays, wherein the scanned data is used to establish repair values for the failing subset of arrays.

2. The method as recited in claim 1, wherein the plurality of operating parameters are at least one of a voltage operating parameter and a frequency operating parameter.

3. The method of claim 1, further comprising:

in response to a failing subset of arrays, scanning data into the anbset failing subset of arrays utilizing a scan ring.

4. The method of claim 3, wherein the scanned data is at least one of a wordline and a bitline.

5. The method of claim 3, further comprising:

storing the repair values;

in response to changing a current value of an operating parameter to a new value, sending data patterns from the on chip built in self test engine to the subset of the plurality of arrays on the processor at the new value of the operating parameter; and comparing the response from the subset of the plurality of arrays at the new value of the operating parameter to the stored repair values.

6. The method of claim 5, wherein the repair values are stored in an external database.

7. The method of claim 5, wherein the stored repair values are keyed by a part number.

8. The method as recited in claim 1, wherein a select signal is used to select the subset of the plurality of arrays.

9. A built-in on-chip test system, comprising:

a set of arrays having input ports and data output ports;

a test logic connected to the set of arrays, wherein the test logic tests the set of arrays at a plurality of operating parameters by sending test data into the input ports to access the set of arrays, wherein results are generated at the data output ports of the set of arrays at the plurality of operating parameters and comparing the results from the set of arrays to an expected result for the set of arrays a control logic connected to the set of arrays, wherein the control logic selectively repairs failed arrays within the set of arrays by scanning data into the failed arrays using a scan chain, wherein the scanned data is used to establish repair values for the failed arrays.

10. The built-in on-chip test system as recited in claim 9, wherein the plurality of operating parameters are at least one of a voltage operating parameter and a frequency operating parameter.

11. The built-in on-chip test system as recited in claim 9, wherein the test logic includes compare logic to compare the results from the set of arrays to an expected result for the set of arrays and wherein the control logic selectively repairs an array in the failed arrays with a repair value for the set of arrays.

12. The built-in on-chip test system as recited in claim 9, wherein the test logic is an array built in self test engine.

13. The built-in on-chip test system as recited in claim 9, wherein the built-in on-chip test system includes an array built in self test engine, comprising:

a data control register for generating and applying deterministic data patterns to the data input ports of each array within the set of arrays;

an address control register for generating addresses for application to each array within the set of arrays in coordination with the data control register; and a comparator for comparison of data input to the data input ports of each array within the set of arrays from the data control register with data output from the data output ports of each array within the set of arrays.

14. The built-in on-chip test system as recited in claim 9, wherein the test logic is a plurality of built in self test engines.

15. The built-in on-chip test system as recited in claim 9, wherein the set of arrays are a set of random access memories.

16. An apparatus for repairing a plurality of arrays on a processor with an on chip built in self test engine on the processor, comprising:

selecting means for selecting a subset of the plurality of arrays for testing;

sending means for sending data patterns from the on chip built in self test engine to the subset of the plurality of arrays on the processor at a plurality of operating parameters;

receiving means for receiving a response at the on chip built in self test engine from the subset of the plurality of arrays at the plurality of operating parameters;

comparing means for comparing the response from the subset of the plurality of arrays to an expected response using the on chip built in self test engine.

determining means for determining a failing subset of arrays in response to the response from the subset of the plurality of arrays being different from the expected response; and repair means, in response to a failing subset of arrays, for repairing said failing subset of arrays by scanning data into the failing subset of arrays, wherein the scanned data is used to establish repair values for the failing subset of arrays.

17. The apparatus as recited in claim 16, wherein the plurality of operating parameters are at least one of a voltage operating parameter and a frequency operating parameter.

18. The apparatus as recited in claim 16, further comprising:

a scan ring, in response to a failing subset of arrays, for scanning data into the failing subset of arrays.

19. The apparatus as recited in claim 18, wherein the scanned data is at least one of a wordline and a bitline.

20. The apparatus as recited in claim 18, further comprising:

storing means for storing the repair values;

sending means, in response to changing a current value of an operating parameter to a new value, for sending data patterns from the on chip built in self test engine to the subset of the plurality of arrays on the processor at the new value of the operating parameter; and comparing means for comparing the response from the subset of the plurality of arrays at the new value of the operating parameter to the stored repair values.

21. The apparatus as recited in claim 20, wherein the repair values are stored in an external database.

22. The apparatus as recited in claim 20, wherein the stored repair values are keyed by a part number.

23. The apparatus as recited in claim 16, wherein a select signal is used to select the subset of the plurality of arrays.

24. A computer program product included within a computer readable medium and executed by a data processing system for repairing a plurality of arrays on a processor with an on chip built in self test engine on the processor, the data processing system including the processor, comprising:

instructions for selecting a subset of the plurality of arrays for testing;

instructions for sending data patterns from the on chip built in self test engine to the subset of the plurality of arrays on the processor at a plurality of operating parameters;

instructions for receiving a response at the on chip built in self test engine from the subset of the plurality of arrays at the plurality of operating parameters;

instructions for comparing the response from the subset of the plurality of arrays to an expected response using the on chip built in self test engine;

instructions responsive to a determination that the response from the subset of the plurality of arrays is different from the expected response, determining a failing subset of arrays; and instructions for repairing said failing subset of arrays utilizing a scan ring by scanning data into the failing subset of arrays, wherein the scanned data is used to establish repair values for the failing subset of arrays.

25. The computer program product as recited in claim 24, wherein the plurality of operating parameters are at least one of a voltage operating parameter and a frequency operating parameter.

* * * * *